United States Patent [19]
Kanayama

[11] Patent Number: 4,466,125
[45] Date of Patent: Aug. 14, 1984

[54] COMMUNICATION CONTROL SYSTEM

[75] Inventor: Kenzi Kanayama, Nagaokakyo, Japan

[73] Assignee: Omron Tateisi Electronics Co., Kyoto, Japan

[21] Appl. No.: 370,963

[22] Filed: Apr. 22, 1982

[30] Foreign Application Priority Data

Apr. 24, 1981 [JP] Japan .................. 56-62925
May 2, 1981 [JP] Japan .................. 56-67527
Jul. 24, 1981 [JP] Japan .................. 56-116554

[51] Int. Cl.$^3$ .................. H04B 3/60; H04Q 7/02
[52] U.S. Cl. .................. 455/56; 340/825.54; 340/990; 343/6.8 LC; 455/33; 455/38; 455/58
[58] Field of Search .................. 455/31, 33, 38, 53, 455/54, 56, 58; 340/825.08, 825.54, 24, 38 R; 179/2 EB; 343/6.8 LC

[56] References Cited

U.S. PATENT DOCUMENTS 3,623,003 11/1971 Hewitt .................. 340/825.54
4,352,955 10/1982 Kai et al. .................. 455/31

Primary Examiner—Marc E. Bookbinder
Attorney, Agent, or Firm—Schwartz, Jeffery, Schwaab, Mack, Blumenthal & Koch

[57] ABSTRACT

A communication control system includes a plurality of base stations for making communication with a plurality of cars and a central base station. The central base station conducts centralized supervisory of each base station. The car travel while transmitting data signals indicating that car number codes have not been provided thereto. The base station transmits a car number code provided by the central base station to each car when the base station receives the data signals. The car receives and stores the car number code. The base station calls the cars through the provided car number codes when the base station communicates with the cars.

7 Claims, 19 Drawing Figures

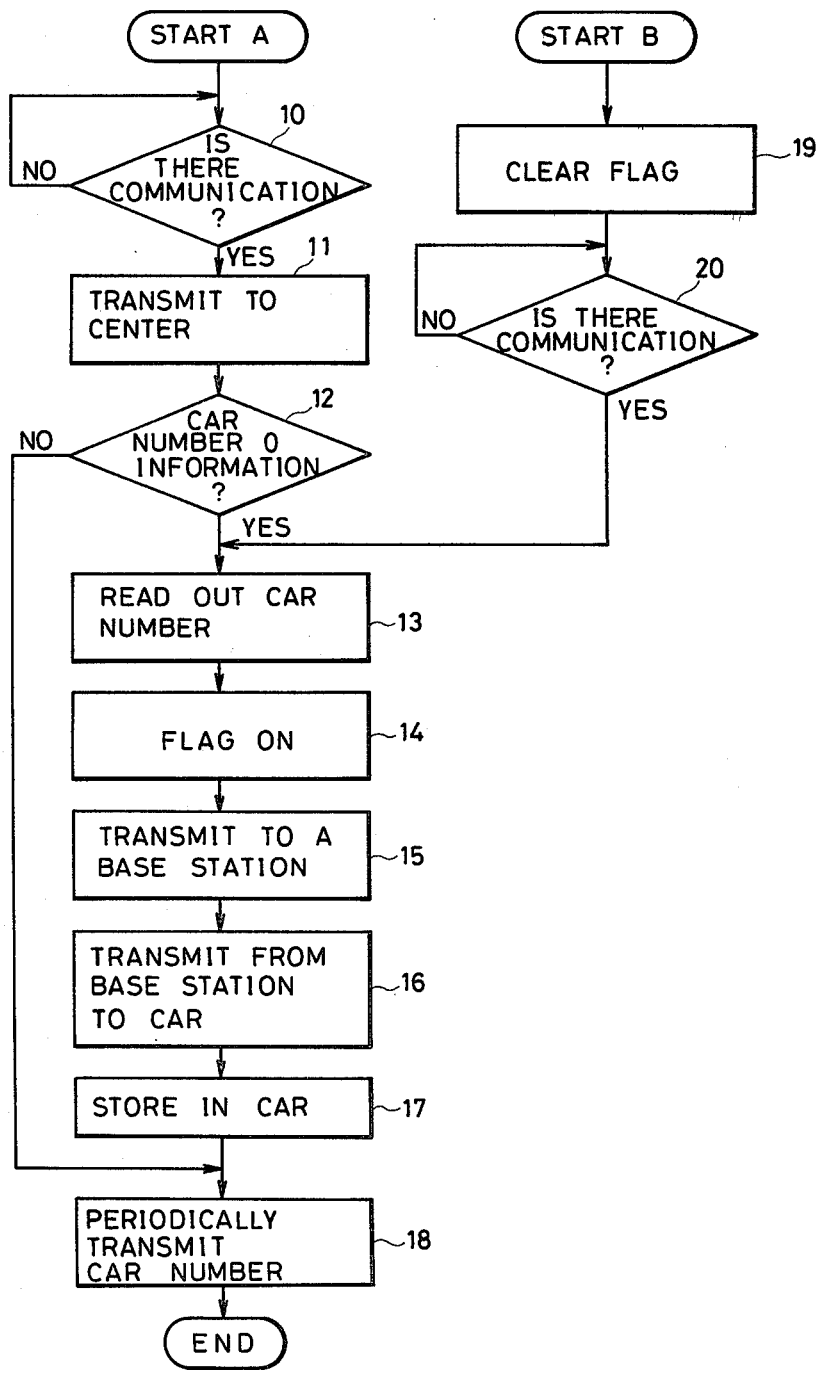

(A) CAR
(B) BASE STATION
(C) CENTRAL BASE STATION (A) CAR
(B) BASE STATION
(C) CENTRAL BASE STATION

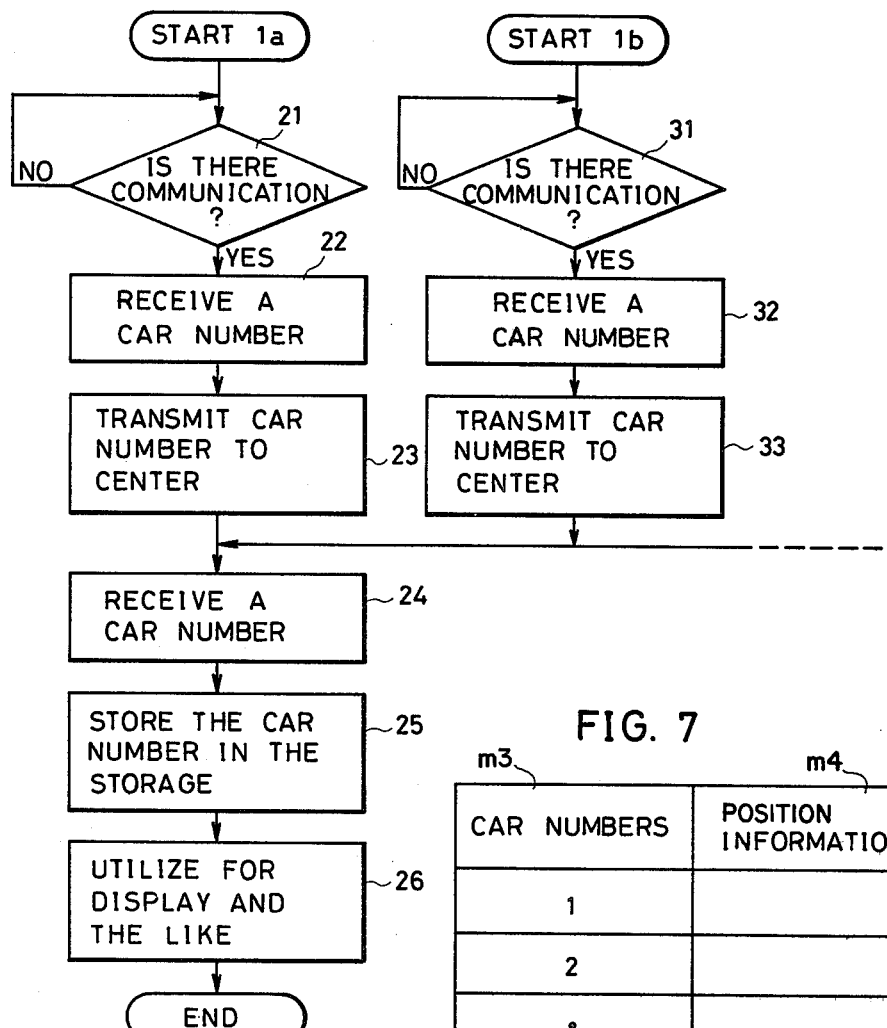

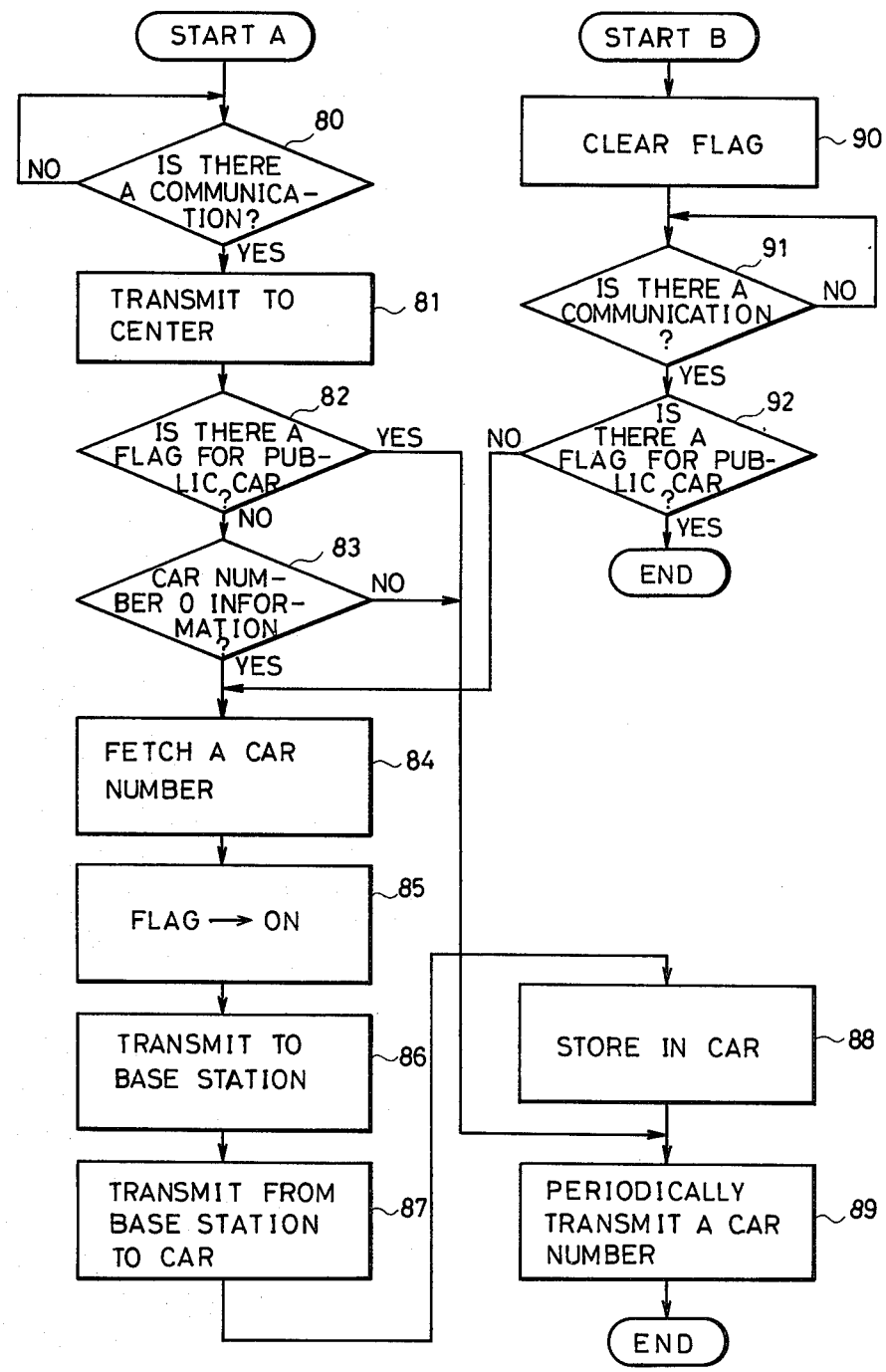

FIG. 13A
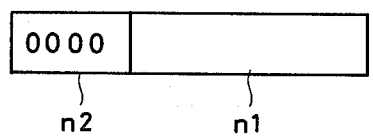
FIG. 13B
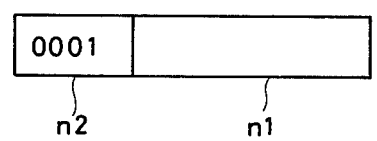
FIG. 14A
| m2 | m1 |
|---|---|
| F1 | CN1 |
| F2 | CN2 |
| F3 | CN3 |
| F4 | CN4 |
| F5 | CN5 |
| ⋮ | ⋮ |
| Fn | CNn |
FIG. 14B
| m3 |
|---|
| S·CN1 |
| S·CN2 |
| S·CN3 |
| S·CN4 |
| S·CN5 |
| ⋮ |
| S·CNn |

COMMUNICATION CONTROL SYSTEM

BACKGROUND OF THE INVENTION

1. Field of the Invention

The present invention relates to a communication control system. More particularly, the present invention relates to an improvement of a communication control system such as a system making a communication between, for example, a central base station and a vehicle.

2. Description of the Prior Art

Conventionally, a communication control system is known for making communication between a central base station and a vehicle. Such a communication control system is designed such that a corresponding vehicle is called from a central base station by a previously assigned identification code which is inherent to each vehicle. Various kinds of information such as a weather reports and traffic information can be transmitted to the car. In addition, such a communication control system is designed such that the vehicle can request specific information from the central base station.

On the other hand, since an inherent identification code is previously provided to each vehicle in the above described communication control system, a movement of each vehicle can be monitored by the central base station based on the identification code. This means that an owner of each vehicle can be easily identified by the identification code and thus each individual's movement can be made clear. Accordingly, there is a serious problem that privacy can be infringed in a prior communication control system of this type.

In addition, there is known a vehicle monitoring system wherein each vehicle to which an identification code is assigned in advance travels while transmitting the identification code and a central base station receives the identification code and indicates the traveling state of that vehicle. However, such a system has the same problem of privacy infringement.

SUMMARY OF THE INVENTION

The present invention provides a communication control system wherein an identification code is provided from a communication station to a vehicle entering an area served by the communication station, without providing inherent identification information in advance to the vehicle. More particularly, an identification code is transmitted from a communication station by a first transmitter/receiver means. A vehicle is provided with a second transmitter/receiver means and identification code storing means. Then, if and when the second transmitter/receiver means receives an identification code from the communication station, the vehicle stores the identification code in identification code storing means and returns the identification code back to the communication station.

In accordance with the present invention, an arbitrary identification code can be provided to a vehicle from a communication station. The identification code is provided without any relation to an owner or a driver of the vehicle and thus the communication station can not know who the owner of the vehicle is. Therefore, there is no problem of infringing his privacy.

In a preferred embodiment of the present invention, if there are a plurality of vehicles, different identification codes can be provided to each vehicle. More particularly, each vehicle transmits a signal indicating that an identification code has not been provided thereto. A communication station receives from the vehicles the signals indicating that identification codes have not been provided thereto when the vehicles enter a specified area served by that communication station. Then, the communication station transmits an identification code which has not been assigned to any of vehicles yet. The vehicle first entering the area served by the communication station stores the identification code and transmits the identification code received to the communication station. The communication station receives the identification code from the vehicle and transmits the received identification code to the vehicle. The vehicle receives the identification code as transmitted from the communication station and determines whether the identification code as received coincides with the stored identification code. If not, the stored identification code is erased, and if coincidence is made the stored identification code is retained. On the other hand, in the communication station, when the identification code from a first vehicle is received, a new identification code is provided to a next vehicle if the received identification code coincides with the identification code as last transmitted therefrom.

Therefore, with the present embodiment, sequentially updated identification codes can be transmitted to subsequent vehicles after an identification code is provided to a vehicle first entering an area served by the communication station and thus there is no fear that the same identification code is provided to a plurality of vehicles even if the plurality of vehicles enter an area served by the same communication station.

In another embodiment of the present invention, a previously fixed identification code is provided to a vehicle such as a public vehicle with which there is no fear of infringing privacy. The vehicle moves while transmitting the fixed identification code. If and when the communication station receives the fixed identification code, the communication station does not transmit the identification code. Accordingly, the communication station merely transmits an identification code to a vehicle which transmits a signal indicating that an identification code has not been provided thereto and thus when a number of vehicles enter a communication area, the number of vehicles to which an identification code is to be provided is reduced. As a result, the load of the communication station can be decreased.

In a further embodiment of the present invention, a communication station comprises a plurality of base stations and a central base station for centralized supervisory of the plurality of base stations. The base stations are separately located in the vicinity of paths along which vehicles move. These base stations make communication with vehicles entering areas in which the vehicles are capable of communicating with the respective base stations. On the other hand, a central base station provides a different identification code to each communication station. Accordingly, in accordance with the present embodiment, since identification codes are collectively controlled by a central base station, the same identification code can not be provided by several base stations in an overlapped manner, and thus confusion can be prevented.

Therefore, it is an object of the present invention to provide a communication control system enabling communication between a communication station and a vehicle, without causing a privacy infringement problem.

An aspect of the present invention is to provide different identification codes to each of a plurality of vehicles even if the plurality of vehicles enter the same area. Another aspect of the present invention is to identify a specific vehicle using an assigned identification code so that communication can be made possible.

Another aspect of the present invention is to provide an identification code from a communication station to only vehicles which are to be protected from privacy infringement and to provide a previously fixed identification code to other vehicles, so that the load on the communication system can be reduced.

The above and other objects, features and advantages of the present invention will become apparent from the following description when taken in conjunction with the accompanying drawings which show preferred embodiments of the present invention.

BRIEF DESCRIPTION OF THE DRAWINGS

FIG. 2 is a flow diagram for explaining the operation of the system as shown in FIG. 1;

FIG. 6 is a flow diagram showing how the system as shown in FIG. 1 applies to a mobile body monitoring apparatus;

FIG. 7 is a diagram showing data stored in the storage portions provided in the central base station as shown in FIG. 1 for carrying out a second embodiment of the present invention;

FIG. 12 is a flow diagram for explaining the operation of a third embodiment of the present invention;

FIG. 13A and FIG. 13B are diagrams showing car numbers used in the third embodiment; and FIGS. 14A and B are diagrams showing data stored in the storage portions provided in the central base station as shown in FIG. 1 for carrying out the third embodiment of the present invention.

DESCRIPTION OF THE PREFERRED EMBODIMENTS

Figure 1A:
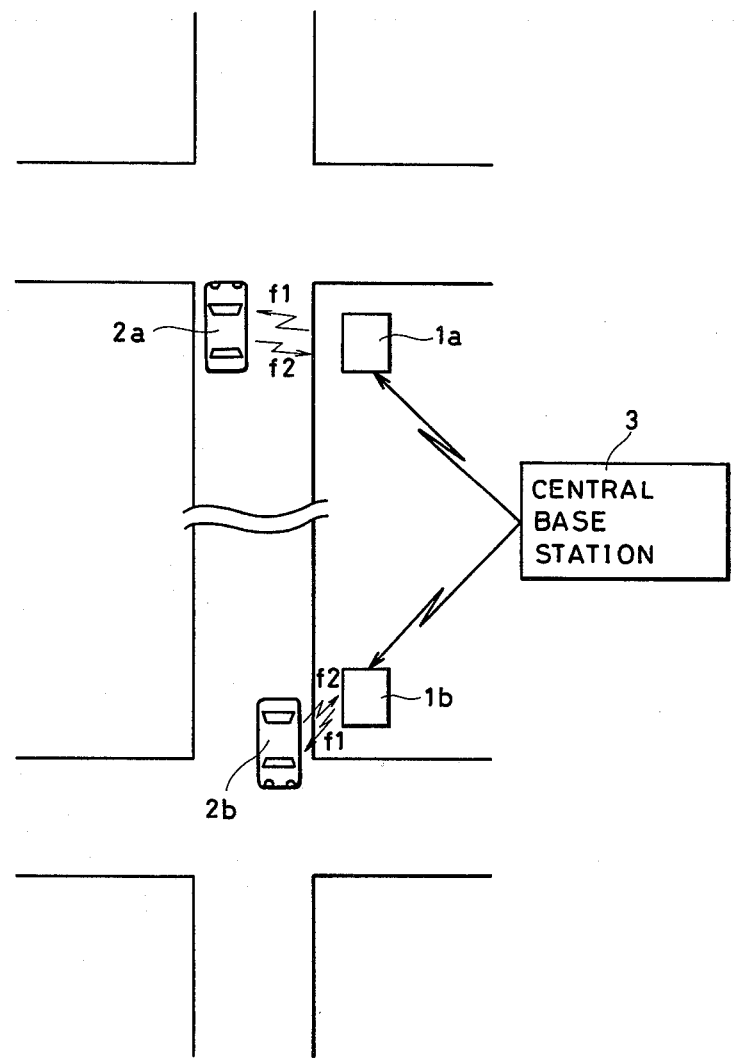
FIG. 1A is a drawing for explaining an outline of a communication control system of an embodiment of the present invention.

FIG. 1A is a diagram explaining an outline of a communication control system of an embodiment of the present invention. The embodiment of the present invention is adapted to provide an identification code in the form of a car number to a car 2a, for example, from a base station 1a, for example. More particularly, the car 2a travels while transmitting data indicating that a car number has not been provided thereto, and the base station 1a transmits a car number for identifying the car 2a when it receives the data from the car 2a. Then, the car 2a receives and stores the car number and returns the car number back to the base station which transmitted the car number. Thereafter, the base station 1a calls the car 2a based on the car number and communicates with the car 2a.

To this end, the base stations 1a and 1b are separately located in the vicinity of paths along which the cars 2a and 2b travel. Although only two base stations are shown in this embodiment, more base stations can be provided. These base stations 1a and 1b are adapted to communicate with a transmitter/receiver apparatus 2 (which will be subsequently described in detail with reference to FIG. 1B) located in cars 2a and 2b. More particularly, the base stations 1a and 1b transmit to a car 2a or 2b, a car number through a very weak radio signal of frequency f1 and the transmitter/receiver apparatus 2 in the cars 2a and 2b transmits data indicating that a car number has not been provided through a very weak radio signal of frequency f2. Accordingly, the base stations 1a and 1b are enabled to communicate with any cars entering an area within which the base stations are capable of communication. The structure of the base stations 1a and 1b will be described in detail in the following with reference to FIG. 1B.

A central base station 3 collectively monitors a plurality of base stations 1a and 1b and controls car number codes to be provided to each of cars 2a and 2b. The central base station 3 will be described in detail in the following with reference to FIG. 1D.

Figure 1B:
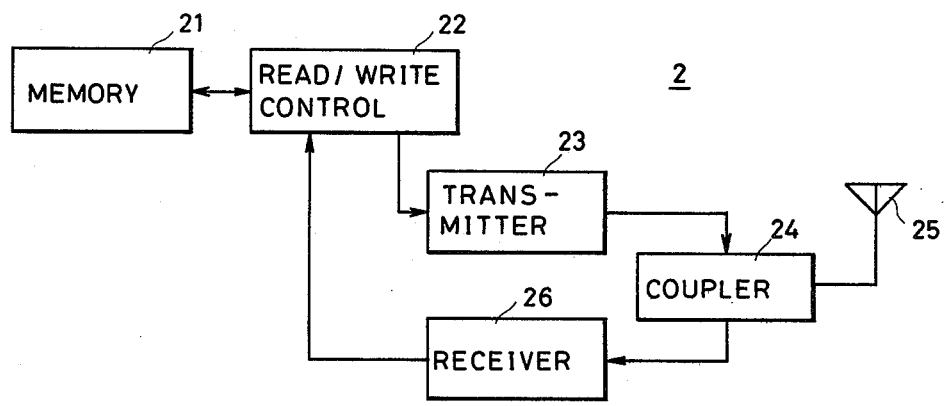
FIG. 1B is a schematic block diagram of a transmitter/receiver apparatus located in cars 2a and 2b, respectively, as shown in FIG. 1A.

FIG. 1B is a schematic block diagram of a transmitter/receiver apparatus located in the cars 2a and 2b. Referring to FIG. 1B, transmitter/receiver apparatus 2 will be explained. A memory 21 includes a storage area for storing a data indicating that a car number has not been provided to the car, for example, "000", and a storage area for storing car numbers provided from the base station 1a or 1b. A read/write control circuit 22 is a circuit for reading out the data or writing a car number by addressing the memory 21. The data read out from the memory 21 is provided to a transmitter 23. The transmitter 23 transmits a radio signal comprising a signal of frequency f1 which is modulated with the data. The radio signal is transmitted to the base station 1a or 1b from an antenna 25 through a coupler 24. A receiver 26 receives a radio signal from the base station 1a or 1b inputted through an antenna 25 and a coupler 24. The receiver 26 demodulates the radio signal to output a corresponding car number so as to provide it to the read/write circuit 24. Correspondingly, the read/write circuit 22 designates an address of the memory 21 and stores the car number in the corresponding storage area.

Figure 1C:
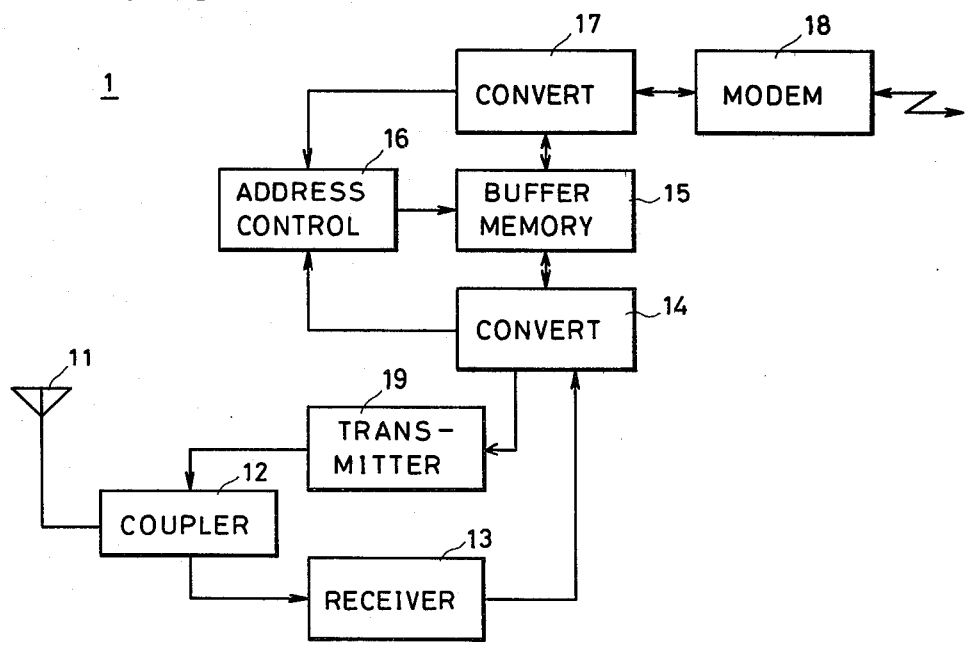
FIG. 1C shows a schematic block diagram of base stations 1a and 1b shown in FIG. 1A.

FIG. 1C is a schematic block diagram of the base stations 1a and 1b shown in FIG. 1A. Referring to FIG. 1C, the base station 1 will be explained. A receiver 13 receives a radio signal from a car 2a or 2b inputted through an antenna 11 and a coupler 12. The receiver 13 demodulates the radio signal and outputs bit serial data indicating that a car number has not been provided thereto. The data is provided to a converter circuit 14. The converter circuit 14 includes a serial-parallel converting circuit (not shown) for converting bit serial data from the receiver 13 into bit parallel data which is provided to a buffer memory 15, and a parallel-serial converting circuit (not shown) for converting the bit parallel data from the buffer memory 15 into bit serial data which is provided to the transmitter 19. When the data is inputted, the converter circuit 14 provides to an address control circuit 16 a control signal indicating that the data is inputted thereto. The address control circuit 16 is responsive to the control signal from the converter circuit 14 to address the buffer memory 15 and to store the data in the storage area corresponding to the address.

The buffer memory 15 is connected to a converter circuit 17. The converter circuit 17 includes a parallel-serial converter circuit (not shown) for converting the data into bit serial data which is provided to a modem 18, and a serial-parallel converter circuit (not shown) for converting a bit serial car number from the modem 18 into bit parallel data which is provided to the buffer memory 15. When a car number is inputted from the modem 18, the converter circuit 17 provides to an address control circuit 16 a control signal indicating that the car number is inputted from the modem 18. The address control circuit 16 is responsive to the control signal to access the address in which the car number is stored. The modem 18 modulates and demodulates data using frequency shift keying so as to transmit to a central base station 3 data indicating that the car number being stored in the buffer memory 15 has not been previously used and to receive the car number from the central base station 3. The modem 18 is connected to the central base station 3 through a transmission line.

Figure 1D:
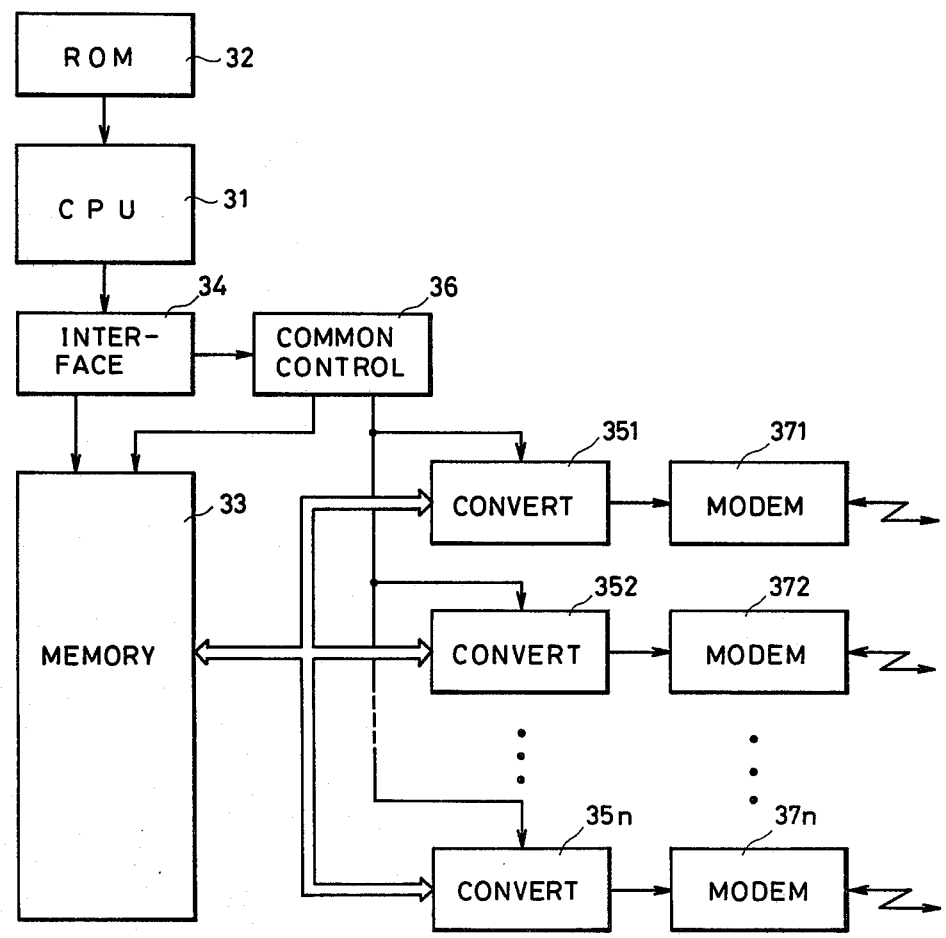
FIG. 1D is a schematic block diagram of a central base station 3.

FIG. 1D is a schematic block diagram of the central base station 3. Referring to FIG. 1D, the central base station 3 will be explained. A central processing unit 31 performs the process of providing car numbers to each car 2a and 2b. To this end, the central processing unit 31 is connected to a read only memory 32 wherein a program is stored in advance. A memory 33 includes storage areas for storing different car numbers, respectively. Each storage area in the memory 33 is designated by an address signal outputted from the central processing unit 31 through an interface 34, so that a corresponding car number is outputted from a corresponding storage area. The car number as outputted is provided to converting circuits 35l to 35n. The converting circuits 35l to 35n include a parallel-serial converting circuit (not shown) for converting the bit parallel car number outputted from the memory 33 into a bit serial car number. A common control circuit 36 is responsive to a control signal from the central processing unit 31 for sequentially switching the converting circuits 35l to 35n in a time divisional manner. Modems 37l to 37n are provided corresponding to the respective base stations 1a, 1b, ... and are connected to the base station 1a, 1b, ... through transmission lines. The modems 37l to 37n transmit the car numbers from the converting circuits 35l to 35n to each of the base stations 1a, 1b, ... using frequency shift keying.

Figure 3:
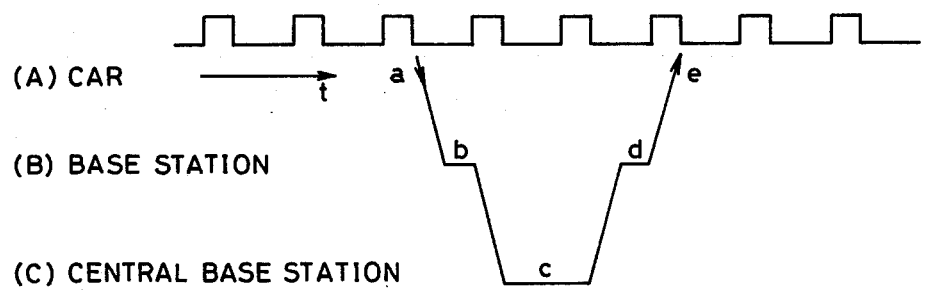
FIG. 3 is a time chart for explaining the operation of the system as shown in FIG. 1.
Figure 4:
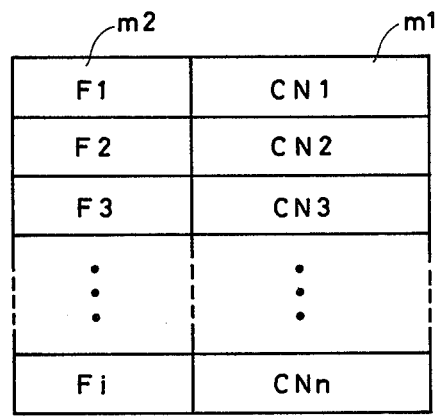
FIG. 4 is a diagram showing data stored in the storage portions provided in a base station.
Figure 5:
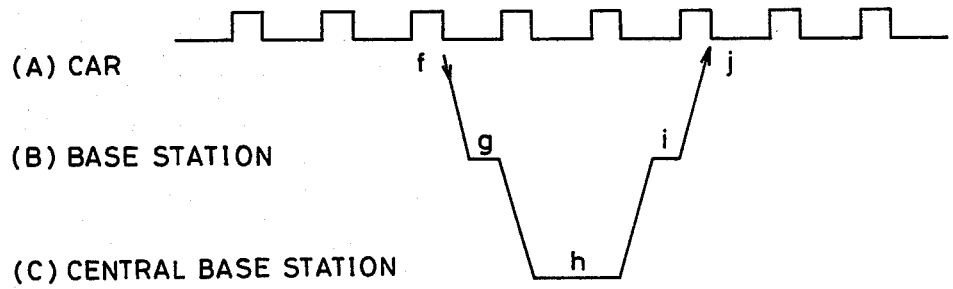
FIG. 5 is a time chart for explaining the update operation of the system shown in FIG. 1.

FIG. 2 is a flow diagram for explaining the operation of the system as shown in FIGS. 1A to 1D. FIG. 3 is a time chart for explaining the operation of the system as shown in FIGS. 1A to 1D. FIG. 4 is a diagram showing data stored in the storage portions provided in the central base station. FIG. 5 is a time chart for explaining an update operation of the system shown in FIG. 1.

In FIG. 2, START A indicates the start of operation in the case where a new number is provided to a car and START B indicates the start of operation in the case where a number of a car is updated.

For example, assuming that a new number is provided to a car 2a adjacent to a base station 1a, the base station 1a makes a decision in the step 10 in FIG. 2 as to whether the base station 1a communicates with the car. As shown in the time chart of FIG. 3, the car 2a repeatedly transmits a signal indicating that it has not been provided with a car number. This signal may be a predetermined car number such as $\phi$. However, if the car 2a has not reached an area where the base station 1a is capable of communicating with the car, the question "Is there communication?" is answered NO and thus the base station 1a is in a waiting state in the step 10 since the base station 1a can not receive a signal from the car 2a. If and when the car 2a reaches a communication area of the base station 1a, that is, the car 2a reaches the point a in the time chart of FIG. 3, the question "Is there communication?" is answered YES and thus the sequence proceeds to the step 11. In the step 11, the base station 1a transmits to the central base station 3 a massage that a car to which a specific car number has not been provided has just entered the communication area of the base station 1a. This corresponds to the point b in the time chart of FIG. 3. In the step 12, the central base station 3 determines whether the signal from the base station 1a is a signal indicating that a specific car number has not been provided to a specific car. In this case, the determination is YES and thus the sequence proceeds to the step 13. In the step 13, the central base station 3 reads from a self-stored storage a car number (spare number) wherein a flag for indicating that the number has been already provided to a car is a logical "0".

The storage in the central base station 3 comprises, as shown in FIG. 4, at least a car number storage area m1 and an area m2 for a flag indicating that a number has been already provided to a car. Car numbers CN1, CN2, CN3 ... are stored in the car number storage area m1. When either of these car numbers has been already provided to a car, the corresponding flag Fi is made to be a logical "1" and when no number is provided to any of cars, the corresponding flag Fi is made to be a logical "0". Accordingly, in the step 13, a car number which has not been provided yet to any is read out. In the step 14, the flag area corresponding to the car number as read out is set to a logical "1" in the central base station 3. Subsequently, in the step 15, the central base station 3 transmits the above described car number as read out to the base station 1a. The steps 12 to 15 correspond to c described in the time chart of FIG. 3.

In the step 16, the base station 1a transmits the car number from the center base station 3 to the car 2a. This step 16 corresponds to d described in the time chart of FIG. 3. In the step 17, the car 2a receives the car number from the base station 1a and stores the same in the storage. This step 17 corresponds to e described in the time chart of FIG. 3. Thereafter, the car 2a continues to transmit the provided car number as stored for predetermined time period (step 18). The car number stored in the storage for the car 2a is updated by the central base station 3, or cleared after a predetermined time period (for example, one day) passes.

If the car which enters the communication area of the base station 1a has already been provided with car number, the determination in the step 12 is NO and thus the sequence proceeds to the step 18 and the car continues to transmit the car number which had been already provided.

In the case where a car 2a has already stored the car number and the central base station 3 updates the car number for car 2a to a new car number, the operation starts from START B shown in FIG. 2. In the step 19, the central base station 3 clears all of flags, that is, sets all of the flags to logical "0". Then, the decision of Is there communication? is made in the base station 1a. If the car 2a enters the communication area of the base station 1a, the decision is YES and thus the sequence proceeds to the step 13. Thereafter, the operations in the above described steps 14 to 17 are performed in the same manner as the case where a new car number is provided, and a new car number is stored in the storage for the car 2a. The communication time chart in this case is shown in FIG. 5, wherein, as similar to FIG. 3, the car enters the base station at the timing of point f and a new car number is transmitted from the car at other points.

FIG. 6 shows a control flow diagram in which the system as shown in FIG. 1 applies to a mobile body monitoring apparatus. A storage portion in the central base station 3 in this case includes, as shown in FIG. 7, an area m3 for storing car numbers and an area m4 for storing information indicating the position of each base station for each car number.

In FIG. 6, assuming that the car 2a enters a communication area of the base station 1a, in the step 21, it is determined whether there is a car communicating with the base station 1a and thus the decision of YES is made and the sequence proceeds to the step 22. In the step 22, the base station 1a receives the car number being transmitted from the car 2a. Subsequently, in the step 22, the base station 1a transmits the car number as received to the central base station 3. At that time, the number of the base station is also transmitted as a point information together with the car number received. In the step 23, the central base station 3 receives the car number and the point information transmitted from the base station 2a and in the step 24, these information are stored in the storage areas m3 and m4, respectively.

The same operations as those described above are performed in the case where another car, for example, 2b, enters a base station area at another point. For example, car 2b enters the area serviced by the base station 1b. In the step 31, it is determined whether there is the car communicating with a base station, and if the car 2b enters a communication area, the decision is YES and thus the sequence proceeds to the step 32. Then, the base station 1b receives a car number from the car 2b and in the step 33, the car number and the point information received are transmitted to the central base station 3. The subsequent operations are the same as those in case where the car enters the area serviced by the base station 1a. The central base station 3 reads from the storage portion the car number and the point information as received in the step 25 and makes the same display in a displaying portion of a monitoring apparatus (not shown). This display gives clear information of where a car with each car number is.

If the storage portion is adapted to store time information as well as a car number and point information, it is possible to know the traveling path for a certain car and the time period required for traveling the distance between one point and another point.

Figure 8:
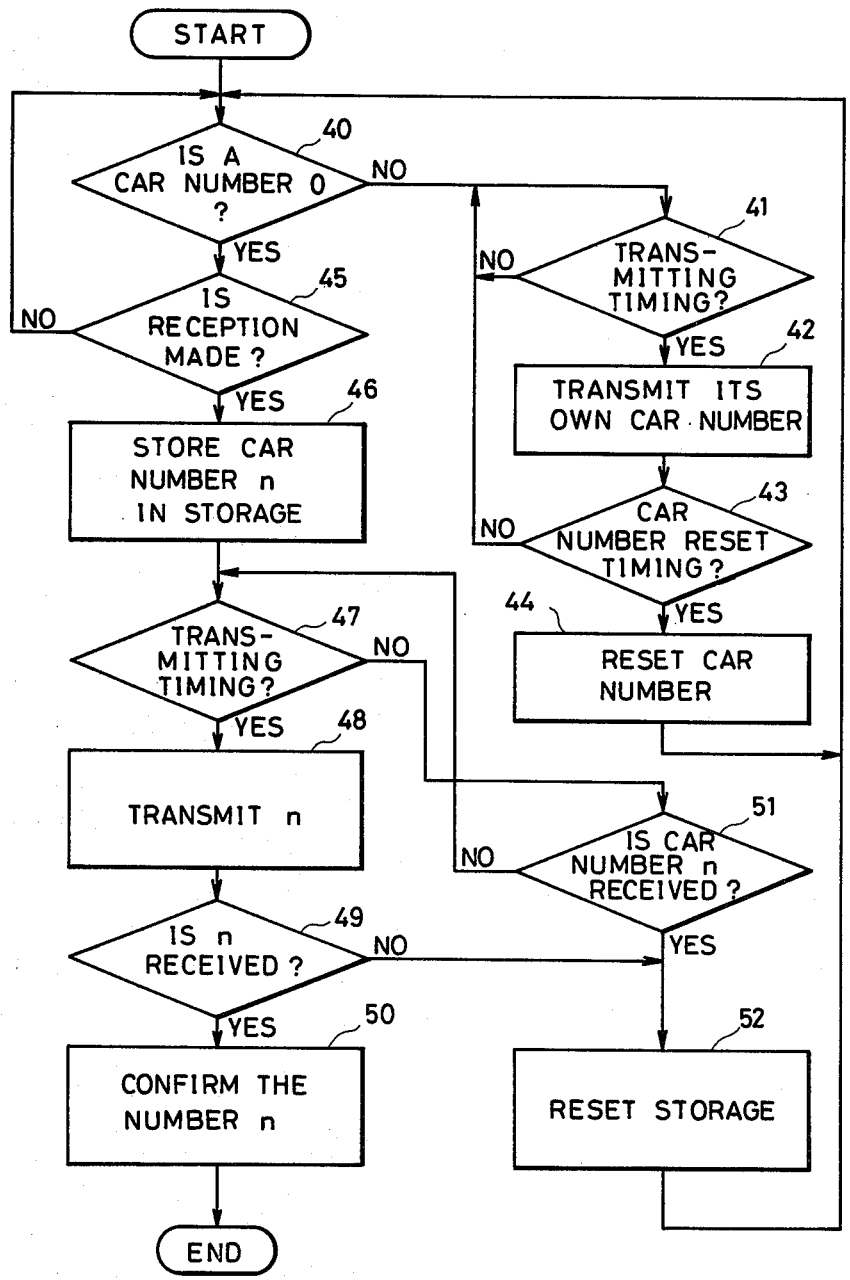
FIG. 8 is a flow diagram for explaining the operation of a communication control portion provided in a car included in the second embodiment of the present invention.
Figure 9:
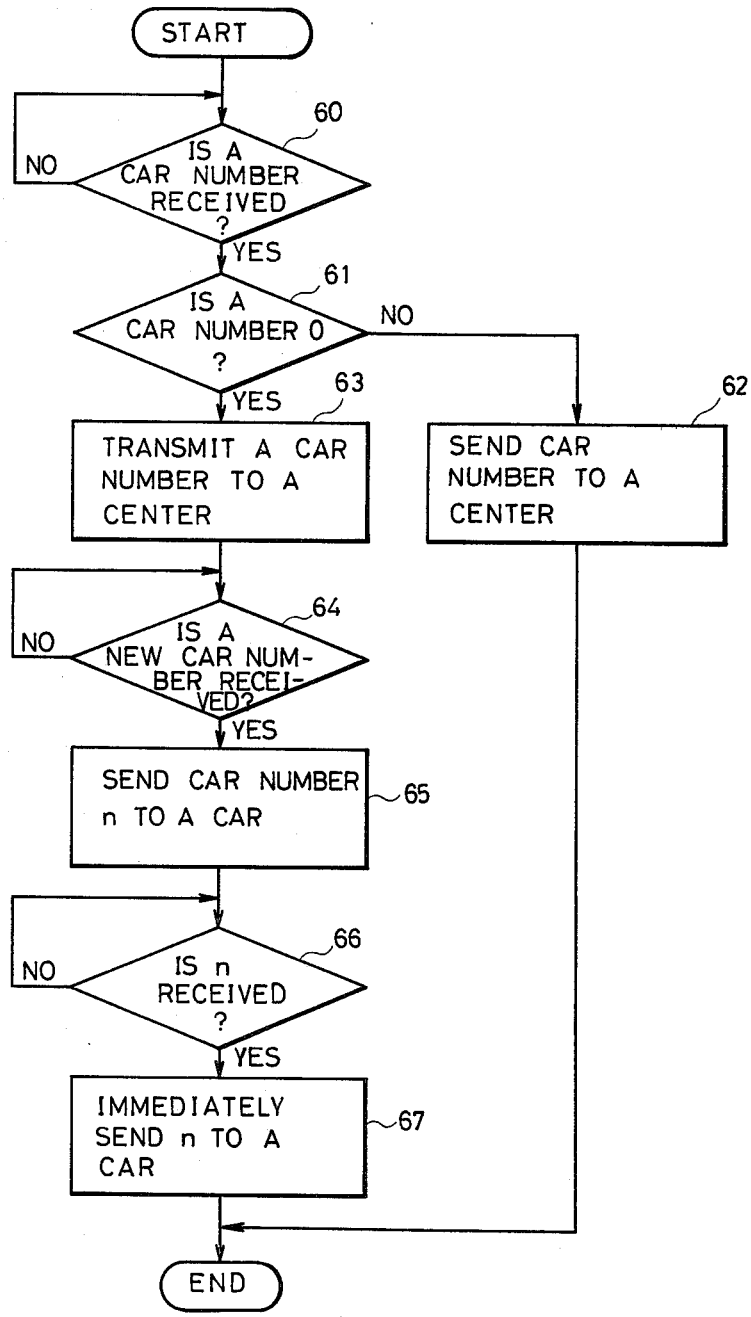
FIG. 9 is a flow diagram for explaining the operation of a base station in the second embodiment of the present invention.
Figure 10:
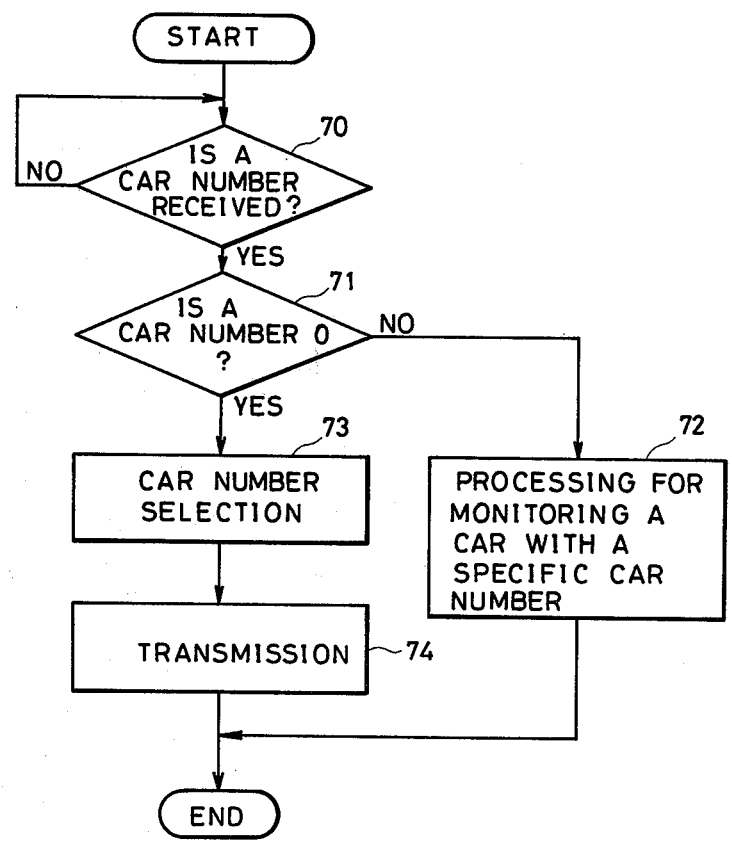
FIG. 10 is a flow diagram for explaining the operation of a central base station in the second embodiment of the present invention.
Figure 11:
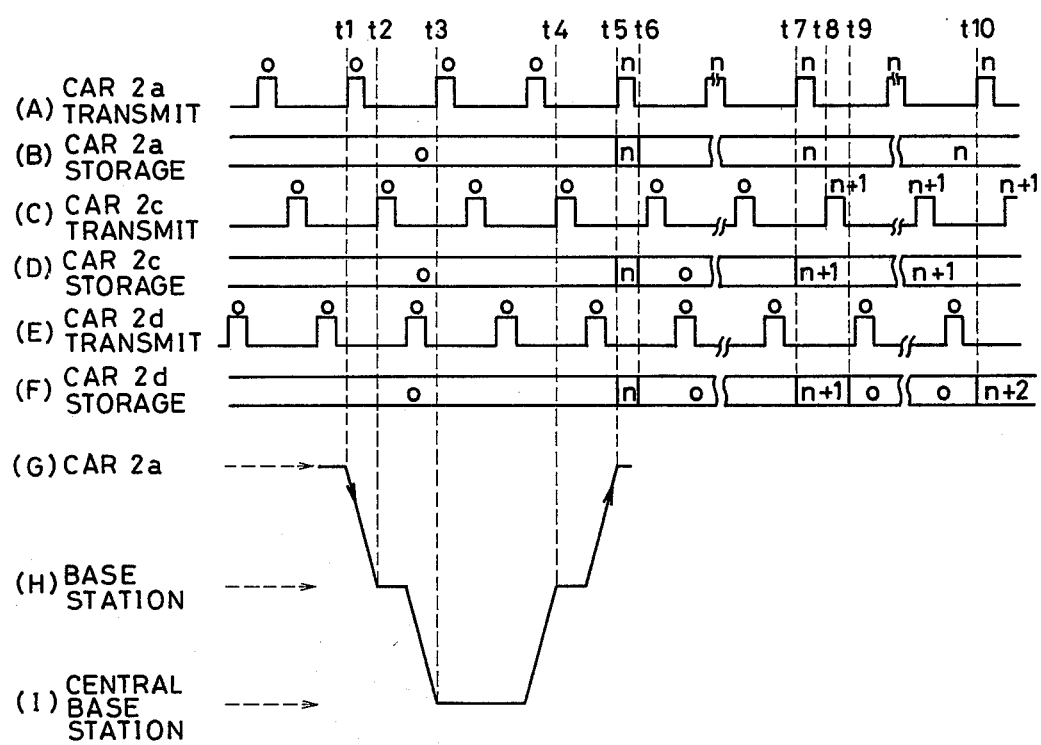
FIG. 11 is a time chart for explaining the operation of the second embodiment of the present invention.

FIG. 8 is a flow diagram for explaining the operation of a communication control program executed in a car according to a second embodiment of the present invention. FIG. 9 is a flow diagram for explaining an operation of a base station in the second embodiment of the present invention. FIG. 10 is a flow diagram for explaining an operation of a central base station in the second embodiment of the present invention. FIG. 11 is a time chart for explaining the operation of the second embodiment of the present invention.

In the above described embodiment, there may be a conflict because the same car number could possibly be provided to a plurality of cars which have not been assigned car numbers and which plurality of cars enter a common communication area of a base station. Therefore, the present embodiment is adapted such that the same car number can not be provided to a plurality of cars even if a plurality of cars enter the same communication area of one base station.

As shown in FIG. 8, after a sequence starts in the step 40, it is determined whether respective traveling cars 2a and 2b have stored codes indicating that a specific car number has not been provided. More particularly, it is determined whether the code stored in, respectively, cars 2a and 2b is 0. The cars store a $\phi$ code when no car number has been provided by a base station. If a specific number has been already provided, the decision is NO and thus the sequence proceeds to the step 41 wherein it is determined whether the system timing is proper for transmission. Although each traveling car transmits the specific number already provided at its inherent timing or repetition frequency, each car must transmit in accordance with its inherent timing, thus, the decision is NO when the transmitting timing is not proper for that car and thus a waiting state is entered. If the transmitting timing is proper, in the step 42, respective traveling cars 2a and 2b transmit their specific numbers. Then, after transmitting, the sequence proceeds to the step 43 wherein it is determined whether a car number reset timing has occurred. For example, this determination is NO unless a day is terminated or a reset instruction signal or the like are entered from the central base station 3, and thus the steps 41 to 43 are repeated during travel of a car. If a car number reset timing comes in the step 43, the sequence proceeds to the step 44 wherein the operation of "reset of car number" is performed and the sequence is returned back to START.

In the step 40, the case where a traveling car has not received a car number yet, the decision is YES and thus the sequence proceeds to the step 45 wherein it is determined whether reception is made. If the traveling car has not entered a communication area of the base station yet, the decision is NO and thus the sequences of the steps 45, 40 and 45 are repeated until the traveling car enters the communication area of base station. If the traveling car enters the communication area, the decision is YES and thus the sequence proceeds to the step 46 wherein a car number n transmitted from the base station is received and stored in the storage portion. Then, in the step 47, it is determined whether a transmitting timing occurs. If the transmitting timing for that car occurs, the decision is YES and thus the sequence proceeds to the step 48, wherein the car number n is transmitted. Subsequently, in the step 49, it is determined whether the car number n is received immediately after transmitting. If the base station immediately retransmits the car number n which was transmitted from that car, the decision is YES and the sequence proceeds to the step 50 wherein it is confirmed that the car number n is the specific number provided to that car.

In the step 47, the decision is NO if the transmitting timing for that car does not occur and thus the sequence proceeds to the step 51 wherein it is determined whether the car number n is received. If the car number n has not been transmitted from the base station, the decision is NO and the sequences of the steps 51, 47 and 51 are repeated and thus the traveling car is in a waiting state. If the car number n has been transmitted, the decision is YES and the sequence proceeds to the step 52. The decision of YES in the step 51 means that other cars which previously had received no specific car numbers, and which entered the communication area of the same base station, received the same number as the number of that car and these other cars have already transmitted the specific same number. Therefore, in the step 52, the storage portion of that car is reset to a cleared state indicating that a specific car number has not been provided and the sequence is returned back to START. In the step 49, the storage portion in its own car is also reset in the step 52 in the case where the car number n is not received immediately after transmitting.

As shown in FIG. 9, the base station 1a or 1b determines whether the car number is received in the step 60 and waits until a traveling car enters a communication area. If the traveling car enters a communication area, the decision of the step 60 is YES and the sequence proceeds to the step 61. In the step 61, it is determined whether the signal from the traveling car is a signal indicating that a specific car number has not been provided to that specific car. If a number has been already provided to the car, the decision is NO and the sequence proceeds to the step 62 wherein the number is transmitted to the central base station 3. If the signal from the traveling car indicates that a specific car number has not been provided, the decision in the step 61 is YES and the sequence proceeds to the step 63 wherein the signal received, which indicates that a specific car number has not been provided, is transmitted to the central base station 3. Subsequently, in the step 64, it is determined whether a car number n is received from the central base station 3 and the waiting state continues until a car number n is transferred from the central base station 3. If the car number n is transferred from the central base station 3, the decision is YES and the sequence proceeds to the step 65 wherein the car number n is transmitted to the traveling car. Subsequently, in the step 66, the decision of "Is n received" is made, that is, it is determined whether the car number n is transmitted from the traveling car and is received. Upon receipt of the car number n, the decision is YES and the sequence proceeds to the step 37 wherein the car number n is once again transmitted to the traveling car.

As shown in FIG. 10, the central base station 3 is in a waiting state pending a "Yes" to the question "is a car number received" in the step 70. If a car number is transmitted from the base station, the decision is YES and the sequence proceeds to the step 71, wherein it is determined whether the car number as received is a signal indicating that a specific car number has not been provided. If the number as received is a specific car number already provided, the decision is NO and the sequence proceeds to the step 72 wherein "processing for monitoring a specific car to which a specific car number is provided" necessary for the specific purpose is made. If a car number transmitted from the base station is a signal indicating that a specific car number has not been provided, the decision in the step 71 is YES and the sequence proceeds to the step 73 wherein "selection of a car number" is made. More particularly, a specific car number n which has not been provided to any of cars and thus has not been used is derived from the storage portion in the central base station. Then, in the step 74, this new car number n is transferred to the base station.

In the system of the embodiment as controlled in the above described manner, assuming that three cars, including traveling cars 2a, 2c and 2d, which have not received specific car numbers yet, enter the communication area of the base station 1a, the operation thereof will be explained in the following.

The traveling cars 2a, 2c and 2d repeatedly transmit respective car numbers at a predetermined frequency as shown in a time chart of FIG. 11. However, the time period for transmitting is very small as compared with the frequency of repetition for transmitting and thus the transmitting timing for each traveling cars 2a, 2c and 2d will not coincide with each other.

If the respective traveling cars 2a, 2c and 2d are out of the communication area of the base station 1a, these traveling cars 2a, 2c and 2d merely transmit a signal (car number 0) indicating that a specific car number has not been provided. These signals are time delayed relative each other. However, if the traveling cars 2a, 2c and 2d all enter the communication area in the base station 1a at the time of t1, the base station 1a transfers a car number 0 signal as received into the central base station 3. The central base station 3 receives the car number 0 signal as transferred at the time of t3. The central base station 3 derives a car number n which has not been provided to any of traveling cars. Then, the car number n is transferred to the base station 1a which, in turn, receives the car number signal n at the time of t4 and transmits the car number signal n towards each of traveling cars 2a, 2c and 2d. The respective traveling cars 2a, 2c, and 2d receive the car number signal n at the time of t5 and store the car number n in the respective storage portions in the respective traveling cars 2a, 2c, and 2d. In such a case, the first car number transmitting timing occurs in the traveling car 2a after a new car number n is received and stored at the time of t5. The transmission signal of the new car number n from the traveling car 2a is immediately received in the base station 1a, which, in turn, retransmits the same car number to the respective traveling cars 2a, 2c and 2d. The respective traveling cars 2a, 2c and 2d receive the car number n retransmitted from the base station 1a at the time of t6. Then, since the traveling car 2a has already transmitted the signal of the car number n from its own car, it holds the car number n without changing the contents in its storage portion and continues to transmit the signal of the car number n. However, since the traveling cars 2c and 2d received the retransmitted car number n from the base station 1a before transmitting the car number n, the storage portions therein are reset and the stored content is made 0. Since the traveling cars 2c and 2d continue to transmit a car number 0 signal at the time t6, the base station 1a and the central base station 3 transmit to the traveling cars 2a, 2c and 2d which are still in the communication area in the base station 1a, a car number n+1 which has not been provided to any of cars yet, in the same manner as that in the time t2, t3, t4 and t5. If and when the car number n+1 from the base station 1a is received by each traveling car at the time of t7, the car number n stored in the storage portion in the traveling car 2a as shown in the steps 40 and 41 of the control flow diagram in FIG. 8 described in the foregoing is not changed because the traveling car 2a has already received the provided car number n. On the other hand, as far as the traveling cars 2c and 2d are concerned, as can be seen from the step 46 in FIG. 11, a new car number n+1 is stored. The car number n+1 is transmitted from the traveling car 2c at the time t7. This car number n+1 as transmitted is retransmitted from the base station 1a and sent to the traveling cars 2c and 2d. However, since the traveling car 2c has already transmitted the car number n+1, the storage portion thereof is not changed and thus holds the car number n+1 and continues to transmit the car number n+1 subsequently. On the other hand, as far as the traveling car 2d is concerned, the storage portion thereof is reset and the content therein is made to be 0 since the traveling car 2d has not transmitted the car number n+1 yet when the traveling car 2d receives a retransmitted car number n+1 yet when the traveling car 2d receives a retransmitted car number n+1 from the base station 1a at the time of t9. Thus, the traveling car 2d continues to transmit a car number 0 at the time t9. The time period from the time t1 to the time t9 is very short as compared with the time period during which each traveling car is in the communication area of the base station 1a. Accordingly, the base station 1a and the central base station 3 receive a car number 0 signal from the traveling car 2d and transmit a car number signal n+2 which has not been provided to any of cars in the same manner as that in case where the car numbers n and n+1 are provided to the above described traveling cars 2a and 2c, respectively. If the car number signal n+2 is received by the traveling car 2d at the time t10, only the storage portion in the traveling car 2d stores the signal n+2 and the traveling car 2d transmits the car number n+2 when a transmitting timing occurs. The base station 1a which receives the car number n+2 as transmitted retransmits the car number n+2 in the above described manner. Since the traveling car 2d has already received the car number n+2 as retransmitted and has transmitted the car number n+2, the car 2d subsequently holds the car number n+2 and continues to transmit the car number n+2.

Thus, the traveling car 2a stores the car number n, the traveling car 2c stores the car number n+1 and the traveling car 2d stores the car number n+2 and these cars transmit a different car number, respectively. In addition to this, the provision of these different car numbers is made for a very short time period with respect to the time period during which each traveling car is in the communication area in the base station and thus each car number can be provided to each traveling car without any disturbance. Thus, even if a plurality of unnumbered traveling cars enter into the communication area in a base station, communication for providing a car number and other communications can be made without any conflict.

FIG. 12 is a flow diagram for explaining the operation of a further embodiment of the present invention. FIGS. 13A and 13B are diagrams showing car numbers used in the embodiment. FIGS. 14A and 14B are diagrams showing data stored in the storage portions provided in the central base station as shown in FIG. 1 for carrying out the embodiment of the present invention.

In the above described embodiments, since arbitrary car numbers are sequentially provided to all of traveling cars, controlling of the car numbers in the central base station 3 is complicated and in addition to this, since a plurality of traveling cars with car number 0 signals may enter the communication area of a base station at about the same time, the possibility that a conflict may occur in providing car numbers is increased. Thus, in the present embodiment, in the light of the fact that a problem of privacy infringement does not arise in public vehicles such as a bus, a taxi and an official business car, an inherent car number is fixedly provided to such public vehicles. On the other hand, as far as general cars are concerned, arbitrary car numbers are provided from a center base station 3 and are stored in the storage portion of each car. As a result, controlling of car numbers is made easy and thus the conflict caused in providing car numbers can be decreased.

In FIG. 12, START A indicates a start of operation in the case where a kind of a traveling car is determined and a new car number provided to a general car, whereas START B indicates a start of operation when the number of a general car is updated.

For example, assuming that a car 2a is approaching a base station 1a, the base station 1a makes a decision of whether there is a car communicating with the base station 1a in the step 80 of FIG. 12. The storage portion in the car 2a stores car number information which includes a car number code n1 and flags n2 for specifying a general car or a public vehicle, as shown in FIGS. 13A and 13B. In an example as shown, a flag n2 for a general car is defined as "0000" (in FIG. 13A) and a flag n2 for a public vehicle is defined as "0001" to "1111" (in FIG. 13B).

If and when the car 2a which repeatedly transmits any of the above described car number information signals does not reach the communication area in the base station 1a, the decision of whether there is a car communicating with the base station 1a is NO since the base station 1a cannot receive the signal from the car 2a. Therefore, in the step 80, the base station 1a is in a waiting state. If the car 2a reaches the communication area in the base station 1a, that is, the car 2a reaches the point a in the time chart for a general car shown in FIG. 3, the decision of whether there is a car communicating with the station 1a in the step 80 is YES and thus the sequence proceeds to the step 81. In the step 81, the message that the car 2a enters the communication area in the base station 1a is transmitted to the central base station 3. This corresponds to the point b in the time chart of FIG. 3. In the step 82, the central base station 3 determines whether the signal from the base station 1a indicates that there is a flag for a public car and if the decision is NO, that is, it is determined the car in the communication area is a general car, the sequence proceeds to the step 83. In the step 83, it is determined whether the signal from the base station 1a is "information indicating that a specific car number has not been provided to a specific car", which decision is YES in this case, and thus the sequence proceeds to the step 84. In the step 84, the central base station 3 fetches from the storage portion therein a car number (empty number) associated with a flag indicating that the number has not already been provided, the flag being set to a logical "0".

The storage portion in the central base station 3 includes a general car number stoage area m1 and a area m2 for storing a flag indicating that the number has already provided, as shown in FIG. 14, and further includes an area m3 for storing a car number of a public vehicle, as shown in FIG. 13B, wherein the above described general car number storage area m1 stores car numbers CN1, CN2, CN3 . . . and the public car number storage area m3 stores car numbers S.CN1, S.CN2, S.CN3 . . . . In case of a general car, a corresponding flag Fi is made to be a logical "1" when the above described car number has been already provided to any of cars, and a corresponding flag Fi is made a logical "0" when no car number has been provided to any of cars. Accordingly, in the step 84, a car number which has not been provided to any of cars yet is read out. Then, in the step 85, the flag area corresponding to the car number read out is set to a logical "1". Subsequently, in the step 86, the central base station 3 transmits the car number as read out to the base station 1a. The steps 83 to 86 correspond to c in the time chart of the above described FIG. 3.

In the step 87, the base station 1a transmits the car number from the central base station 3 to the car 2a. The step 87 corresponds to d in the time cart in FIG. 3. In the step 88, the car 2a receives the car number from the communicating base station 1a and stores the number in the storage portion. The step 88 corresponds to e in the time chart of FIG. 3. Thereafter, the car 2a continues to transmit the provided car number stored at the interval of a predetermined time period (step 89). The car number in the storage portion of the car 2a is updated by the central base station 3 or is cleared after a predetermined time period (for example, one day).

In the case where the car which enters the communication area in the base station 1a is a public car, the decision of whether there is a flag for a "public car" in the step 82 is YES, and, in case where a car number has already been provided to a general car, the decision of whether it is "a car number 0 information" in the step 83 is NO. As a result, the sequence proceeds to the step 89, respectively, and the car continues to transmit a corresponding inherent car number or a provided car number, respectively. In the case where the car 2a has already stored the car number and the central base station 3 updates the car number to a new car number, the operations are performed from the START B in FIG. 2. In the step 90, the central base station 3 clears to a logical "0" all of the flags for indicating that the car number has been already provided. Then, it is determined in the base station 1a whether there is a car communicating with the base station 1a (in step 91). If the car 2a enters the communication area in the base station 1a, the decision in the step 21 is YES and the sequence proceeds to the step 92. In the step 92, it is determined whether the signal from the base station 1a indicates that there is a flag for a public car and if the decision is NO, the sequence proceeds to the step 84. Thereafter, as similar to the case where a new car number is provided, the operations in the steps 85 to 88 are performed, and a new car number is stored in the storage portion in the car 2a. The communication timing chart for a general car in this case is the same as in FIG. 5. Therefore, it can be considered as the same as the case in the above described FIG. 5 that a car and a base station are in a communication area with respect to each other at the point f and a new car number is transmitted from the car at the point of j.

As described in the foregoing, in accordance with the above described embodiment, privacy for a general car is kept and the control of car numbers in the central base station is made easy, since a system is adopted wherein inherent car numbers are fixedly provided to public cars whereas arbitrary car numbers are provided to general cars from the central base station 3. In addition, even if a plurality of traveling cars enter a communication area in a base station, a conflict caused in providing car numbers can be decreased due to entrance of public cars to which a car number need not be provided, and what is more, even if the present system is adopted, there is no fear that the cost is higher than the conventional one.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A communication control system for making a mutual communication between at least one vehicle and a communication station,
    said communication station comprising
        first transmitter/receiver means for communicating with said vehicle, and
        first control means for causing said first transmitter/receiver means to transmit an identification code for identifying said vehicle;
    said vehicle comprising
        second transmitter/receiver means for communicating with said communication station,
        identification code storing means for storing the identification code from said communication station as received by said second transmitter/receiver means, and
        second control means for causing said second transmitter/receiver means to transmit an identification code stored in said identification code storing means to said communication station;
    wherein said first control means is responsive to reception of said identification code by said first transmitter/receiver means from said vehicle for causing said first transmitter/receiver means to retransmit said identification code; and
    wherein said second control means is responsive to said retransmitted identification code being received by said second transmitter/receiver means for determining whether said received retransmitted identification code corresponds to said stored identification code.

2. The communication control system in accordance with claim 1, wherein
    said second control means is responsive to a correspondence between said retransmitted identification code and said stored identification code for retaining the stored identification code stored in said identification code storing means, and for causing said second transmitter/receiver means to transmit the stored identification code.

3. The communication control system in accordance with claim 2, and further comprising:
    a plurality of vehicles, each of said plurality of vehicles having a transmitter/receiver means, an identification code storing means and a second control means similar to said first mentioned vehicle, said second control means of each said vehicle being operative to cause said second transmitter/receiver means of the same vehicle to transmit an identification code at a time different than transmission times of the other of said vehicles.

4. The communication control system in accordance with claim 3, wherein
said second control means of each said vehicle is operative to cause the transmitter/receiver means of the same vehicle to transmit a code indicating that an identification code has not been assigned, prior to receiving an identification code from said communication station; and
said first control means of said communication station is responsive to the receipt of a code indicating that an identification code has not been assigned for causing said first transmitter/receiver means to transmit an identification code.

5. The communication control system in accordance with claim 1, wherein
said second control means is responsive to noncorrespondence between said retransmitted identification code and said stored identification code for erasing the identification code stored in said storing means.

6. The communication control system in accordance with claim 1, including a plurality of vehicles including vehicles of a first kind, each of said vehicles of a first kind including:
fixed identification code storing means for storing a fixed identification code indicating that the vehicle belongs to said first kind, and
transmitter/receiver means for transmitting said fixed identification code stored in said fixed identification code storing means to said communication station.

7. The communication control system in accordance with claim 1, wherein
said communication station includes
a plurality of base stations, each said base station comprising one said first transmitter/receiver means and one said first communication control means and being separately located in the vicinity of paths along which said vehicle travels for making a communication with said vehicle entering respective regions associated with said base stations, and
a central station for collectively monitoring said plurality of base stations and sending said identification code to said base stations.

* * * * *